United States Patent [19]
Matsuda et al.

[11] Patent Number: 5,896,845
[45] Date of Patent: Apr. 27, 1999

[54] ENGINE FOR MODELS AND METHOD FOR CONTROLLING ENGINE FOR MODELS

[75] Inventors: Norio Matsuda; Michio Yamamoto, both of Mobara, Japan

[73] Assignee: Futaba Denshi Kogyo K.K., Mobara, Japan

[21] Appl. No.: 08/845,139

[22] Filed: Apr. 21, 1997

[30] Foreign Application Priority Data

Apr. 19, 1996 [JP] Japan ................................. 8-098584

[51] Int. Cl.[6] .......................... F02M 57/00; F02D 41/04
[52] U.S. Cl. ........................ 123/480; 123/435; 123/478; 446/456
[58] Field of Search ........................ 123/435, 478, 123/480, 490, 492, 493; 446/454, 456, 457

[56] References Cited

U.S. PATENT DOCUMENTS

| | | | |
|---|---|---|---|
| 4,706,632 | 11/1987 | Kasanami et al. | 123/492 |
| 4,883,035 | 11/1989 | Shimomura et al. | 123/361 |
| 4,996,960 | 3/1991 | Nishiyama et al. | 123/435 |
| 5,394,849 | 3/1995 | Tomisawa | 123/435 |

*Primary Examiner*—Willlis R. Wolfe
*Assistant Examiner*—Hieu T. Vo
*Attorney, Agent, or Firm*—Oblon, Spivak, McClelland, Maier & Neustadt, P.C.

[57] ABSTRACT

An engine for radio controlled models includes an internal combustion engine and a radio control receiver having a control unit for generating a fuel injection signal to control the supply of fuel to the internal combustion engine and a throttle adjusting signal to control an opening of a throttle value. The control unit provides a fuel injection signal based on fuel injection timing which is derived from a stroke signal and control unit provides a fuel injection timing signal to cause the fuel injector of the internal combustion engine to inject fuel into the combustion chamber of the engine.

6 Claims, 7 Drawing Sheets

ENGINE FOR MODELS AND METHOD FOR CONTROLLING ENGINE FOR MODELS

BACKGROUND OF THE INVENTION

This invention relates to an engine for models having a fuel injector and throttle valve, and particularly relates to a programmable engine for models which determines the driving timing of the fuel injector and the quantity of fuel injection depending on the opening of the throttle valve and driving stroke of the engine.

Conventionally, for glow engines of two-cycle or four-cycle which have been known as an engine for models, a carburetor 100 having the structure as shown in FIG. 8 have been used as the means for controlling the feeding rate of fuel to a combustion chamber of an engine.

In the housing 101 of the carburetor 100, a valve body 102 having the shape like a cylinder is provided rotatably around the axis line of the valve body 102 itself. Pipe conduit 101a and 101b extend vertically through the housing 101, and air is supplied from the upper pipe conduit 101a. A passage 102a extends through the valve body 102, and the passage is communicated to the pipe conduits 101a and 101b of the housing 101 with the opening depending on the rotation angle of the valve body 102. An operating arm 103 is connected to a portion of the valve body 102 which projects beyond the one end of the housing 101. An operating part of a servo mechanism not shown in the figure is connected to the operation arm 103, and the servo mechanism rotates the valve body 102 in the housing 101. A needle 104 is fixed to the valve body 102 with a screw, and the projection extending into the valve body 102 is adjustable by turning the needle 104.

A fuel control needle valve 105 is built-in at the other end of the housing 101. The needle valve 105 has a tube 106 and a needle 107 provided in the tube 106. The needle 107 is fixed to the tube 106 with a screw, and the needle 107 is moved in reverse in the tube 106 by turning a knob 108 provided at the base of the needle and the tip opening of the tube 106 can be adjusted. The tip of the needle 104 provided to the valve body 102 is facing to the opening of the tip of the tube 106 of the needle valve 105.

Fuel fed to the needle valve 105 is injected from the clearance between the tip of the tube 106 and the needle 107 to the internal, mixed with air supplied in the valve body 102, and fed to an engine. Because the flow rate of fuel can be adjusted by turning the knob of the needle valve 107, the flow rate of fuel (or air-fuel ratio) can be previously set so that the engine rotates at the maximum rotation speed. The servo mechanism rotates the valve body 102 to adjust air flow rate into the valve body 102, and controls the flow rate of fuel fed to the engine.

According to the carburetor 100, when the engine is accelerated rapidly from the low rotation condition such as idling, a lot of air is fed in the valve body, but the supply of fuel can not follow the supply of air, and the balance of air-fuel ratio is unbalanced. The rotation of the engine increases not smoothly and increases slowly, and can be stopped in the bad case. As a whole, the response is not speedy, the transition from the low rotation speed to high rotation speed or the high rotation speed to low rotation speed requires a long time, it is a disadvantage of the conventional engines. Further, in the case that an engine for models is mounted on a radio control model plane, fuel is fed not adequately to the carburetor due to the adverse effect of centrifugal force caused by flying motion of the model plane, the inadequate feeding of fuel causes the malfunction of the engine.

It is an object of the present invention to provide a fuel injector which is capable of injecting adequate quantity of fuel at adequate timing stably and maintaining the air-fuel balance, capable of deriving the stable and high performance of the engine for models, and capable of speedy response of the engine which is used usually under the severe condition as an engine for models mounted on a radio control model plane for acrobatic flying such as loop flying.

SUMMARY OF THE INVENTION

An engine for models according to the present invention is provided with a cylinder having a combustion chamber, a piston reciprocating in the cylinder, and a crank shaft rotating synchronously with reciprocation of the piston, a fuel injector for injecting fuel into the combustion chamber, a throttle valve for adjusting the quantity of fuel fed to the combustion chamber, a throttle valve driving means for adjusting the throttle valve in response to a throttle adjusting signal, a stroke detection means for detecting the operational cycle of the engine for models and for outputting a stroke signal, and a controller for generating a fuel injection signal to drive the fuel injector at the fuel injection timing determined by the fuel injection starting timing determined based on the stroke signal and by the throttle adjusting signal.

The engine for models includes the stroke detection means which is a rotation detection sensor for detecting the rotation of the crank shaft.

The engine for models has a cam shaft, and the stroke detection means which is a rotation detection sensor for detecting the rotation of the cam shaft.

The engine for models has a temperature sensor for detecting the temperature of the combustion chamber, and the control means which corrects at least any one of the fuel injection starting timing and the fuel injection time depending on the temperature of the combustion chamber detected by the temperature sensor.

The engine for models includes the control means corrects the fuel injection time determined based on the throttle adjusting signal depending on the rate change of the throttle adjusting signal if the rate change of the throttle adjusting signal exceeds a reference value.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENTS

Figure 1:
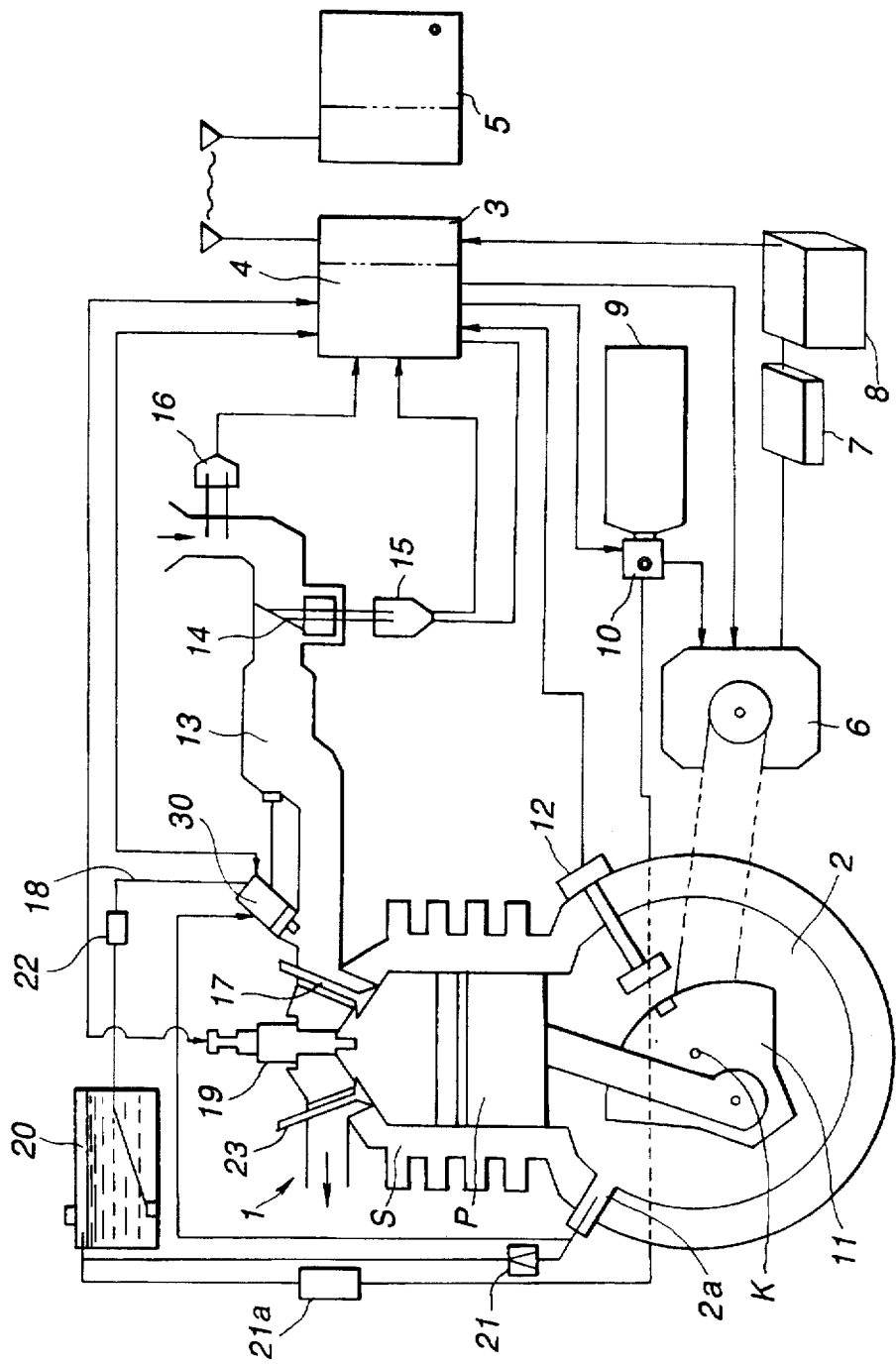
FIG. 1 is a schematic structure of the first embodiment of the present invention.

The first embodiment of the present invention is described in detail hereinafter referring to FIG. 1 to FIG. 5. This embodiment involves an engine for models provided with a programmed fuel injector. The engine for models 1 (referred to as engine 1 hereinafter) of this embodiment is an engine to be mounted on a radio control model plane. The engine 1 shown in FIG. 1 is a four-cycle engine, provided with a cylinder S having a combustion chamber, a piston P which reciprocates in the cylinder S, and a crank shaft K which rotates synchronously with the reciprocation of the piston P. The cylinder S is provided with an intake valve 17, exhaust valve 23, and glow plug 19 which is an ignition means. A temperature sensor is provided to the glow plug 19 to detect the temperature in the combustion chamber. Methyl alcohol fuel containing lubricating oil and ignition accelerating agent such as nitromethane is used for the engine 1. The capacity of the combustion chamber is in a range from 1 to 30 cc, and the maximum pressure caused in the crank chamber 2 ranges from 20 kPa to 100 kPa.

The engine 1 is controlled by a fuel injection circuit 4 serving as a control means of a receiver 3 mounted on the radio control model plane. When an operator operates the transmitter 5, the receiver 3 receives radio wave from the transmitter 5, and the radio wave controls every parts of the model plane including the engine 1.

The engine 1 shown in FIG. 1 is started up by a starter 6. The starter 6 is driven by power supplied from the battery 8 through a rectifier 7 and auxiliary air supplied from an air bomb 9. A selector valve 10 for selecting either the starter 6 or air bomb 9 is controlled by a control means 4 of the radio control receiver 3.

A rotation detection sensor 12 for detecting the position of the rotating crank 11 as a stroke detection means for detecting the operation cycle of the engine 1 and for outputting the stroke signal is provided in the crank chamber 2. The rotation detection sensor 12 detects rotation of the engine 1 for matching the fuel injection timing, and in this embodiment, the rotation detection sensor 12 outputs the intake timing signal (the intake stroke signal as a stroke signal) as the stroke signal. The intake timing signal (intake stroke signal) outputted from the rotation detection sensor 12 is sent to the control means 4 of the radio control receiver 3, and served to control the engine 1. In the case of a four-cycle engine, the intake stroke signal may be detected also by detecting the rotation of a cam shaft.

An intake manifold 13 of the engine 1 is provided with a throttle valve 14 for controlling intake air, air flow rate supplied into the combustion chamber is controlled. The control means 4 of the radio control receiver 3 supplies the throttle valve adjusting signal to a throttle valve driving means 15 to control the opening of the throttle valve. An intake air and temperature sensor 16 is provided at the air intake inlet of the intake manifold 13, the signal generated from the sensor is supplied to the control means 4 of the radio control receiver 3 and used for controlling the engine 1.

The fuel injector 30 is provided near the intake valve 17 of the intake manifold 13. The fuel injector 30 and a fuel tank 20 are connected with interposition of a filter 22. The fuel flows out from the fuel tank 20 and is supplied to the fuel injector 30 through the filter 22. The fuel injector 30 injects fuel into the combustion chamber.

The crank chamber 2 and fuel injector 30 are connected with interposition of the check valve 24. The air pressure generated in the crank chamber 2 synchronously with the driving motion of the engine is applied to the fuel in the fuel injector 30. In other words, the air pressure in the crank chamber 2 is utilized as a pressure means for pressurizing the fuel in the fuel injector 30 in the embodiment. In the embodiment, the maximum pressure applied to the fuel in the fuel injector 30 ranges from about 20 kPa to 100 kPa.

In the embodiment, the air pressure is used to pressurize the fuel in fuel injector 30, however, instead of this system, a system which utilizes the air pressure of the air bomb 9 may be used to pressurize the fuel. For example, a regulator 21a is provided to the air pipe guided from the switching valve 10 of the air bomb 9, the regulator 21a not shown in the figure is connected to the fuel injector 30 and an constant air pressure equivalent to the air pressure in the crank chamber 2 may be applied to the fuel in the fuel injector 30.

Figure 2:
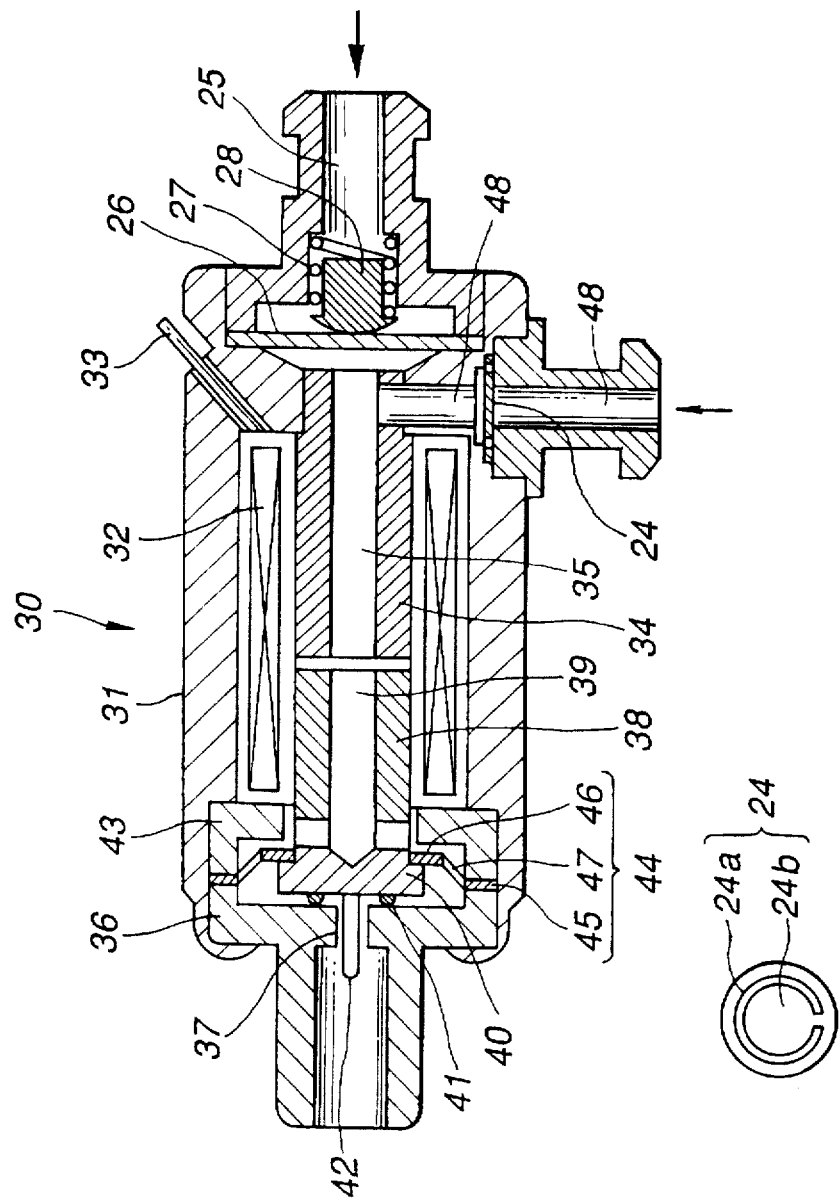
FIG. 2 is a cross-sectional view of a fuel injector of the first embodiment of the present invention.

Next, the structure of the above-mentioned fuel injector 30 is described. As shown in FIG. 2, the fuel injector 30 has an approximately cylindrical box 31. In the box 31, a solenoid coil 32 is contained. The power source terminal 33 for feeding power to the solenoid coil 32 extends to the outside of the box 31 through the box 31. One end of a magnetic core 34 is inserted into the solenoid coil 32 up to the middle. On the side peripheral surface of the magnetic core 34, the fuel feeding passage 48 is formed and the fuel feeding passage 48 communicates to the flow passage 35. The fuel feeding passage 48 extends through the box 31 and communicates to the outside. The fuel feeding passage 48 is connected to the fuel feeding conduit pipe 18 guided from the fuel tank 20.

The fuel feeding passage 48, a check valve 24 is provided as a reverse flow preventing means for preventing reverse flow of fuel fed into the box 31. As shown in FIG. 1, the check valve 24 is a plate like approximately circular member having a prescribed elasticity, and on the central portion of the check valve 24, a circular hole 24a and an approximately circular valve member 24b for controlling the opening of the hole 24a which valve member 24b continues partially to the edge of the hole 24a are formed. The inside diameter of the fuel feeding passage 48 provided outside the check valve 24 and in contact with the check valve 24 is narrower than the outside diameter of the valve 24b of the check valve 24, and a space having an inside diameter wider than the outside diameter of the valve member 24b of the check valve 24 is formed in the fuel feeding passage 48 provided outside the check valve 24. Therefore, the valve member 24b of the check valve 24 can not open to the outside, and fuel in the box 31 will not flow to the outside of the box 31. To the contrary, the valve member 24b of the check valve 24 provided at the gap portion can open to the inside of the box 31, and thus the fuel fed from the external can be introduced into the box 31 smoothly.

An air pressure supply passage 25 is formed on the base end of the box 31 for applying air pressure to fuel in the box 31. The outside end of the air pressure supply passage 25 is connected to the crank chamber 2 (alternatively, connected to the air bomb 9 which is the air pressure supply means) as described hereinbefore. A diaphragm 26 which is made of flexible material is provided in the internal of the air pressure supply passage 25 to apply the air pressure supplied from the crank chamber 2 of the engine to the fuel in the box 31. The diaphragm 26 used in the embodiment is formed of, for example, film of polyethylene, polypropylene, and silicone rubber. The diaphragm 26 defines air-tightly between the space in the box 31 containing fuel and the air pressure supply passage 25. A pressure member 28 is provided with interposition of a spring 27 on the side of air pressure supply passage 25 of the diaphragm 26. The pressure member 28 is in contact with the diaphragm 26 with a prescribed force caused by the spring 27. The end of the pressure member 28 is rounded, and is in contact with the diaphragm 26 over a wide area and can apply stably a prescribed pressure on the diaphragm 26. The air pressure from the crank chamber 2 actuates the pressure member 28 to press the diaphragm 26. The diaphragm 26 is deflected toward the inside of the box 31, and applies a pressure to the fuel in the box 31.

At the end of the valve box 36, a fuel injection orifice 37 is formed. In the box 31, an approximately cylindrical valve body 38 is inserted movably into the solenoid coil 32 adjacent to the magnetic core 34. Another passage 39 which communicates to the passage 35 is formed in the valve body 38. At one end of the valve body 38, a flange 40 is formed. A ring contact ridge 41 for contact with the inside surface of the valve box 36 is formed on the front face of the flange near the periphery of the face. A needle 42 is fixed to the front center of the flange 40, and the needle 42 is inserted slidably into the fuel injection orifice 37 of the valve body 38.

Between the fixing member 43 of the solenoid coil 32 and the valve box 36, a plate spring 44 is provided as a forcing means for forcing the valve body 38 to press in the direction of the fuel injection orifice 37. The plate spring 44 comprises a ring outside fixing part 45, ring inside moving part 46, and a connecting arm 47 for connecting both parts elastically. The fixing part is fixed between the fixing member 43 of the solenoid coil 32 and the valve body 36, and the moving part 46 is engaged with the flange 40 of the valve body 38.

While the solenoid coil is not supplied with power, the valve body 38 is pressed in the direction of the fuel injection orifice 37 by the pressing force of the plate spring 44, the contact ridge 41 of the flange is brought into contact with the inside face of the valve box 36, and the fuel injection orifice 37 is closed. When the solenoid coil is supplied with power, the solenoid coil pulls the valve body 38 toward the magnetic core 34 against the forcing force of the plate spring 44. A clearance is formed between the flange 40 of the valve body 38 and the valve box 36. Fuel pressurized by the air pressure in the crank chamber 2 in the box 31 is injected from the fuel injection orifice to the outside of the box 31.

Fuel injected from the fuel injector 30 is mixed with air taken in depending on the opening of the throttle valve 14, and enters from the air intake valve 17 which opens at the prescribed timing into the cylinder S. The glow plug 19 ignites the fuel-air mixture at the prescribed timing, and the burning starts. The piston P reciprocates in the cylinder S. The reciprocation of the piston P forces the crank shaft K to rotate. The combustion gas is exhausted to the outside of the cylinder from the exhaust valve 23 which opens at the prescribed timing.

In the fuel injector 30 of the embodiment, the relatively low air pressure of about 20 kPa to 100 kPa is used and the fuel itself is not pressurized. This air pressure is considerably lower than the fuel pressure in a fuel injector of an actual vehicle of 250 kPa to 300 kPa, that is, these values are $\frac{1}{3}$ to $\frac{1}{13}$ times that of actual vehicle. Therefore, only the low pressure which the plate spring 44 exerts onto the valve body 38 is sufficient, and the plate spring 44 which can cause only a reduced elastic force which can exert a force of 20 to 100 kPa, which is equivalent to the air pressure applied to the fuel, may be used sufficiently to stop the flow of fuel during no fueling period while no power is supplied.

The operation of the fuel injector of the embodiment is described. When fuel is injected, a voltage is applied to the solenoid coil 32 to cause a magnetic force in the magnetic core 34. The magnetic core 34 pulls the valve body 38 against the pressing force of the plate spring 44. When, the air pressure in the crank chamber 2 of the engine 1 increases with lowering of the piston. The air pressure is applied to the fuel in the fuel injector 30 through the diaphragm 26 of the fuel injector 30, simultaneously the fuel feeding passage 48 of the fuel injector 30 is closed by the check valve 24. The fuel in the fuel injector 30 pressurized with the air pressure applied through the diaphragm 26 is injected from the fuel injection orifice 37 to the outside of the box 31. The fuel injection timing is determined by a rotation sensor 12 for detecting the position of the crank 11 as described in detail hereinafter.

Figure 3:
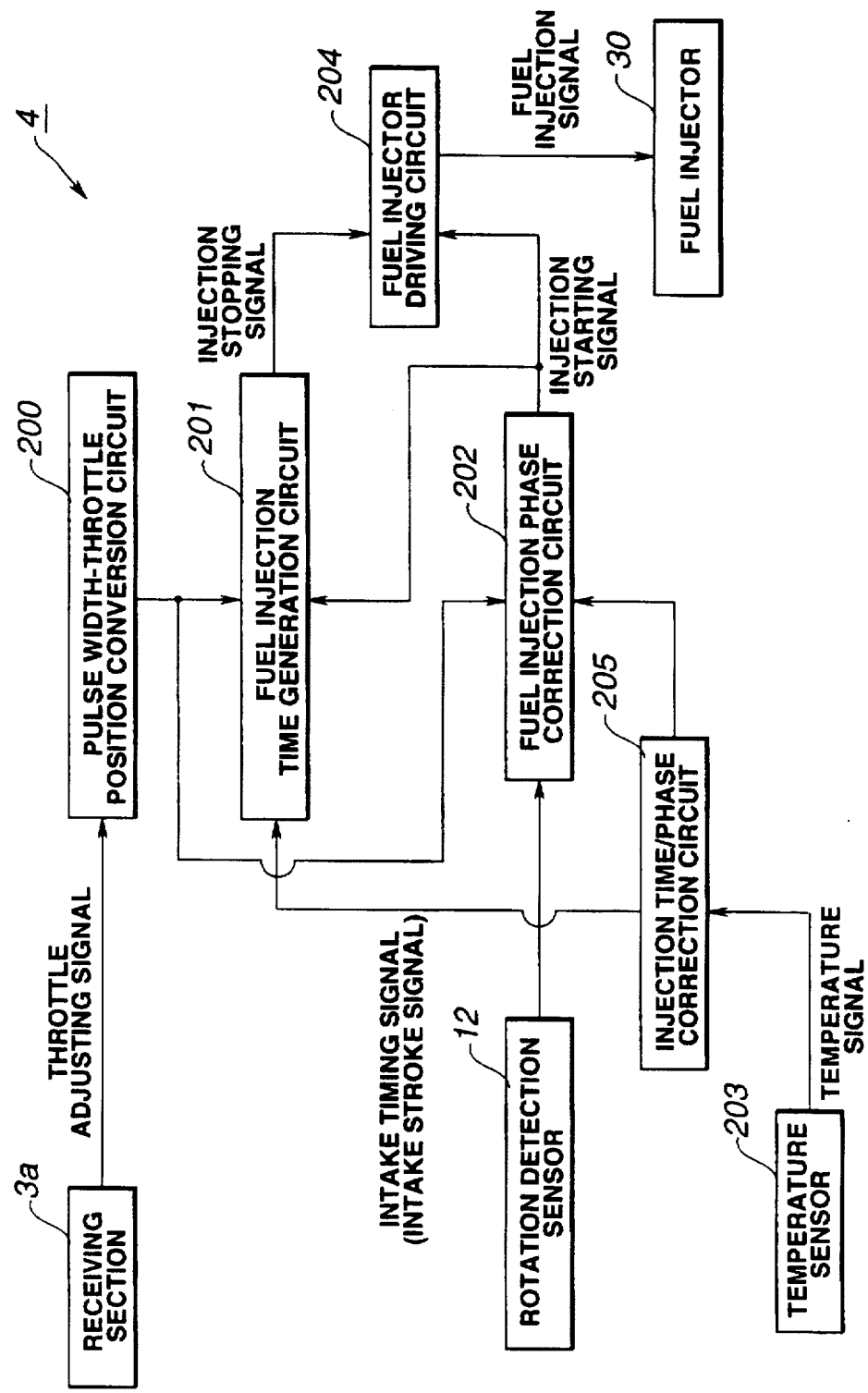
FIG. 3 is a block diagram for illustrating mainly the structure of the control means of the first embodiment of the present invention.
Figure 4:
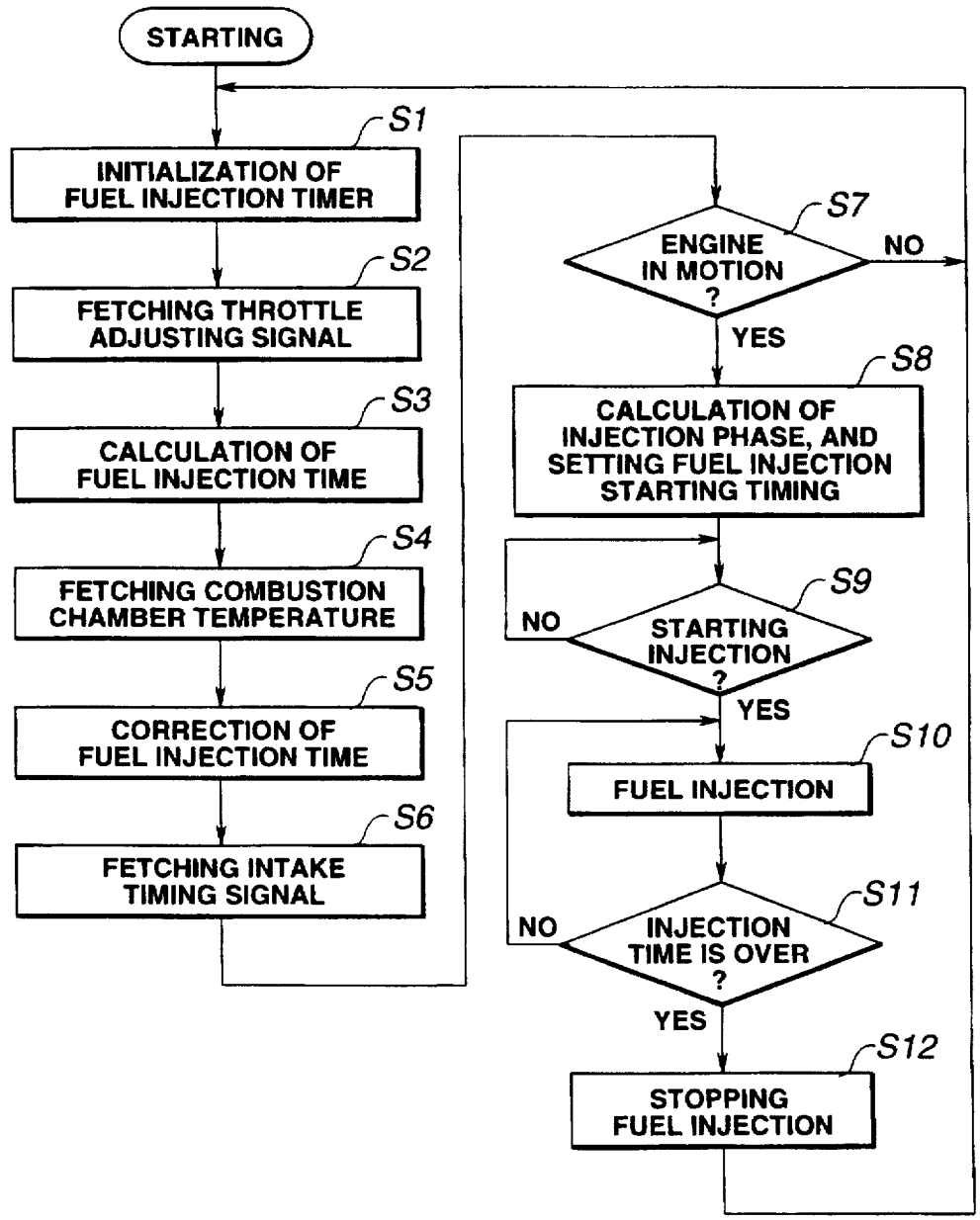
FIG. 4 is a flow chart for describing the control sequence of the first embodiment of the present invention.
Figure 5:
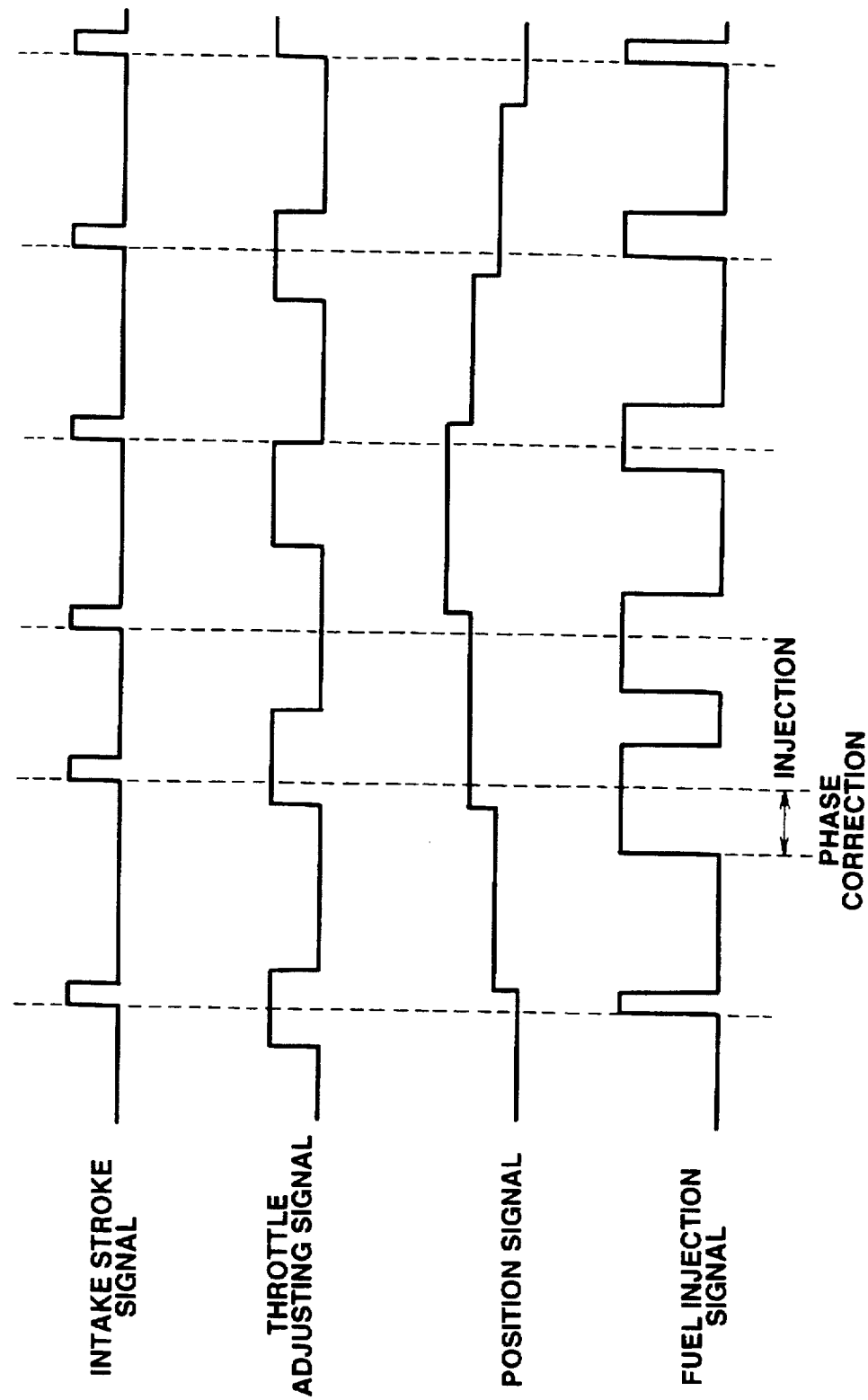
FIG. 5 is a diagram for describing the control of timing in the first embodiment of the present invention.

Next, the controlling by the controller 4 of the engine 1 is described referring to FIG. 3 to FIG. 5. The controller 4 of the engine 1 determines the fuel injection starting timing based on the intake timing signal outputted from the rotation detection sensor 12, and the fuel injection time or fuel injection duration (hereinafter, fuel injection time or timing and fuel injection duration are used interchangeably and are intended to have the same meaning) based on a throttle adjusting signal supplied to the throttle valve driving means 15 to drive the throttle valve 14. A fuel injection signal or fuel injection control signal for driving the fuel injector 30 is generated based on the determined fuel injection starting timing and fuel injection time. The control means 4 corrects the fuel injection time depending on the temperature of the combustion chamber detected by the temperature sensor provided to the glow plug 19. Further, the control means 4 corrects the fuel injection time depending on the rate change of the throttle adjusting signal if the rate change of the throttle adjusting signal exceeds a reference value.

In FIG. 3. a receiving section 3a of a receiver 3 mounted on a radio control model plane generates a throttle adjusting signal based on a signal supplied from the transmitter not shown in the figure. The throttle adjusting signal is supplied to adjust the opening of the throttle 14, and also used to control the fuel injection time of the fuel injector 30 of the control mean 4 built-in the receive 3. The throttle adjusting signal is supplied to the fuel injection time generation circuit 201 through a pulse width-throttle position conversion circuit 200. The fuel injection time generation circuit 201 has a fuel injection time data table corresponding to the position of the throttle valve 14, and sets the fuel injection time corresponding to the supplied throttle adjusting signal.

When the rate change of the throttle valve 14 exceeds a reference value due to an quick opening or closing of the throttle valve 14 and the rate change of the throttle adjusting signal exceeds a reference value, the fuel injection time determined based on the throttle adjusting signal is corrected dependently on the rate change of the throttle adjusting signal. For example, when the engine 1 is accelerated rapidly, the fuel injection time is prescribed to be longer than the fuel injection time prescribed based on the throttle adjusting signal. When the engine 1 is decelerated rapidly, the fuel injection time is set to be shorter than the fuel injection time prescribed based on the throttle adjusting signal. The coefficient in the embodiment ranges, for example, from 2 to ½.

In FIG. 3, the intake timing signal outputted from the rotation detection sensor 12 is supplied to the fuel injection position correction circuit 202. Normally, the fuel injection starting timing is earlier than the intake stroke of the engine 1, and the drift changes depending on the rotation speed of the engine 1. The fuel injection phase correction circuit 202 has the correction data which shows the difference between the intake timing determined correspondingly to the position of the throttle valve 14 and the adequate fuel injection timing corresponding to the rotation speed in a form of data table. The fuel injection phase correction circuit 202 receives a signal from the pulse width-throttle position conversion circuit 200 to which a throttle adjusting signal is supplied and the intake timing signal, and sets a fuel injection starting timing corrected correspondingly to the rotation speed of the engine 1. For example, fuel feeding is apt to delay, therefore the injection timing should be advanced. For example in the engine of the embodiment, a fuel injection signal is supplied at the timing of crank angle of 120 degrees from the starting of exhaustion.

In FIG. 3, the temperature sensor 203 provided to the glow plug 19 supplies the temperature signal to a phase correction circuit 205. The fuel injection time is determined depending on the throttle adjusting signal, but it changes if conditions such as the temperature, atmospheric pressure, humidity, and fuel change. The fuel injection time phase correction circuit 205 detects the condition change based on the signal from the temperature sensor 203, and corrects the fuel injection time so that the cylinder is maintained at a suitable temperature. For example, when the temperature of the combustion chamber rises, that is, the engine is under over-heating condition, the fuel injection time is changed longer to increase the quantity of fuel injection, and the cylinder S is cooled with the mixture. When the temperature sensor 203 detects lowering of the cylinder temperature, the fuel injection time is corrected so as to be shorter to decrease the quantity of the fuel injection and to adjust the temperature of the combustion chamber to a suitable temperature.

As described herein above, the fuel injection time is determined based on the throttle adjusting signal in the fuel injection time generation circuit 201, and the fuel injection time is corrected depending on the rate change of the throttle adjusting signal and temperature of the combustion chamber, thus the adequate fuel injection time is set. Further, in the fuel injection phase correction circuit 202, the fuel injection starting timing is determined synchronously with the stroke of the engine, and the fuel injection starting timing is corrected depending on the rotation speed of the engine and temperature of the combustion chamber, thus the adequate fuel injection starting timing is set.

The fuel injection phase correction circuit 202 outputs an injection starting signal corresponding to the set fuel injection starting timing to the fuel injector driving circuit 204. The fuel injector driving circuit 204 outputs a fuel injection signal to the fuel injector 30, then the fuel injector 30 starts the fuel injection. The injection starting signal is supplied also to the fuel injection time generation circuit 201. The fuel injection time generation circuit 201 starts the count the fuel injection time with the fuel injection timer not shown in the figure upon input of the injection starting signal. When the counting is finished, the fuel injection time generation circuit 201 outputs an injection stopping signal to the fuel injector driving circuit 204. The fuel injector driving circuit 204 stops the supply of the fuel injection signal to the fuel injector 30, and the fuel injector 30 stops the fuel injection.

FIG. 5 shows an example of a timing diagram for describing the relationship between intake stroke signal, throttle adjusting signal, position signal, and fuel injection signal. As it is obvious from the figure, some times the fuel injection signal rises at the rise of the intake signal, but some times the fuel injection signal rises before the rise of intake signal depending on the condition of the throttle adjusting signal and temperature signal.

The control sequence in the control means 4 described herein above is described for steps S1 to S12 respectively in the flow chart shown in FIG. 4. The fuel injection timer of the fuel injection time generation circuit 201 is initialized in S1. A throttle adjusting signal is read in S2. The fuel injection time is calculated by the fuel injection time generation circuit 201 in S3. The temperature signal which indicates the temperature of the combustion chamber from the temperature sensor 203 is fetched in S4. The fuel injection time is corrected depending to the rate change of the throttle adjusting signal and temperature of the combustion chamber in S5. The intake timing signal from the rotation detection sensor 12 is read by the fuel injection phase correction circuit 202 in S6. Next, whether the engine 1 is in rotation or not is judged in S7, and if the engine 1 is judged as in rotation, the injection phase is calculated by the fuel injection phase correction circuit 202, and the fuel injection starting timing is set in S8. The injection starting timing is judged in S9, and the fuel injector 30 starts the fuel injection in S10. When the ending of the injection time is judged in S11, the fuel injector 30 stops the fuel injection in S12.

A radio control model plane on which an engine for models is mounted having the fuel injector 30 of the embodiment performs often acrobatic flying such as loop flying which an actual plane seldom performs. Under such severe flying condition, the feeding of fuel to a fuel injector is apt to be unstable. However, according to the engine for models of the present invention, the injection time is determined depending on the driving timing of the engine and opening of the throttle valve 14, and the value is corrected based on various parameters. Therefore, adequate quantity of fuel is injected at adequate timing. The air-fuel ratio is maintained balanced, the engine exhibits stable and high performance, and speedy response is realized.

Under such severe service conditions, fuel in a fuel tank and fuel in a fuel feeding pipe conduit which connects between a fuel tank and the fuel injector is affected by gravity and centrifugal force due to exquisite operations of the model plane, and the magnitude and direction of the centrifugal force change rapidly. The pressure applied to fuel fed to the fuel injector can not be maintained constant, and in the engine mounted on the model plane, fuel can be affected by the centrifugal force and gravity to result in unstable feeding of fuel.

According to the fuel injector 30 of the embodiment, the fuel filled in the fuel injector 30 is confined once in the fuel injector 30 by the check valve 24, the air pressure generated in the crank chamber 2 is applied to the fuel through the diaphragm 26, and the fuel pressurized at a prescribed pressure is injected. The centrifugal force caused by wight and acceleration and deceleration is larger as the density of an object to which a force is exerted is larger. Generally, the density of fuel used for model planes is 800 to 900 kg/m$^3$ and the density of air is 1 to 1.3 kg/m$^3$, the difference between both densities is large. In other words, air is not affected very much by the force due to acceleration in comparison with fuel. The fuel injector 30 of the embodiment utilizes this principle. In detail, fuel is not pressurized, but, fuel is introduced into the fuel injector 30 and confined by the check valve 24, fuel is pressurized by air which is not affected by the force due to acceleration, this principle is the feature of the present invention. According to the engine for models 1 having the fuel injector 30 of the embodiment, the supply of fuel is stable even under the severe operational conditions, the engine 1 will not stall due to insufficient fuel and excessive fuel supply.

Figure 6:
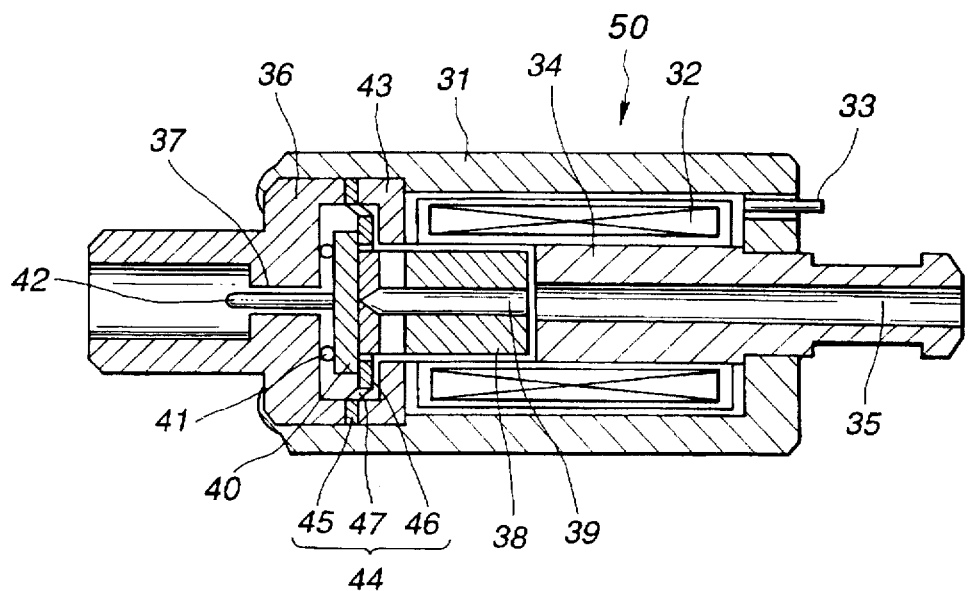
FIG. 6 is a cross-sectional view of a fuel injector of the second embodiment of the present invention.

The second embodiment of the present invention is described referring to FIG. 6. The same engine 1 and the same model on which the engine 1 is mounted as used in the first embodiment are used in this embodiment. The fuel injector 50 has substantially the same structure as the fuel injector 30 in the first embodiment excepting that the fuel injector 50 is not provided with a diaphragm 26, pressure member 28, and check valve 24. The same functionally equivalent components as those of fuel injector 30 in the first embodiment are given the same characters as used in FIG. 2, and detailed description is omitted. In the fuel injector 50, the air pressure guided from the crank chamber 2 of the engine 1 is applied to the fuel in the fuel tank 20, and the pressurized fuel is supplied to the flow passage 35.

According to this embodiment, the fuel injection timing and fuel injection time are determined depending on the driving timing of the engine and the opening of the throttle, and corrected based on various parameters like in the first embodiment. Therefore, the adequate quantity of fuel is injected stably at the adequate timing, the air-fuel ratio is maintained balanced, the engine exhibits stable and high performance, the speedy response is realized. Because the air pressure in the crank chamber 2 which increases with the stroke of the engine pressurizes the fuel, the fuel is fed stably in the same extent as comparable with the first embodiment even if the fuel is accelerated under severe condition.

Figure 7:
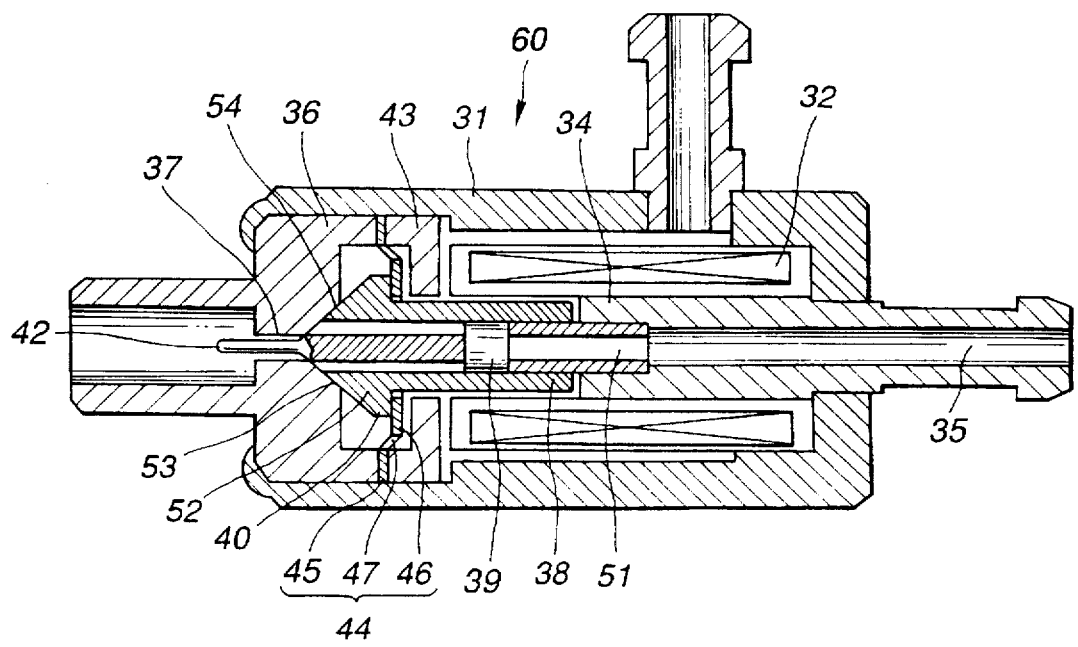
FIG. 7 is a cross-sectional view of a fuel injector of the third embodiment of the present invention.
Figure 8:
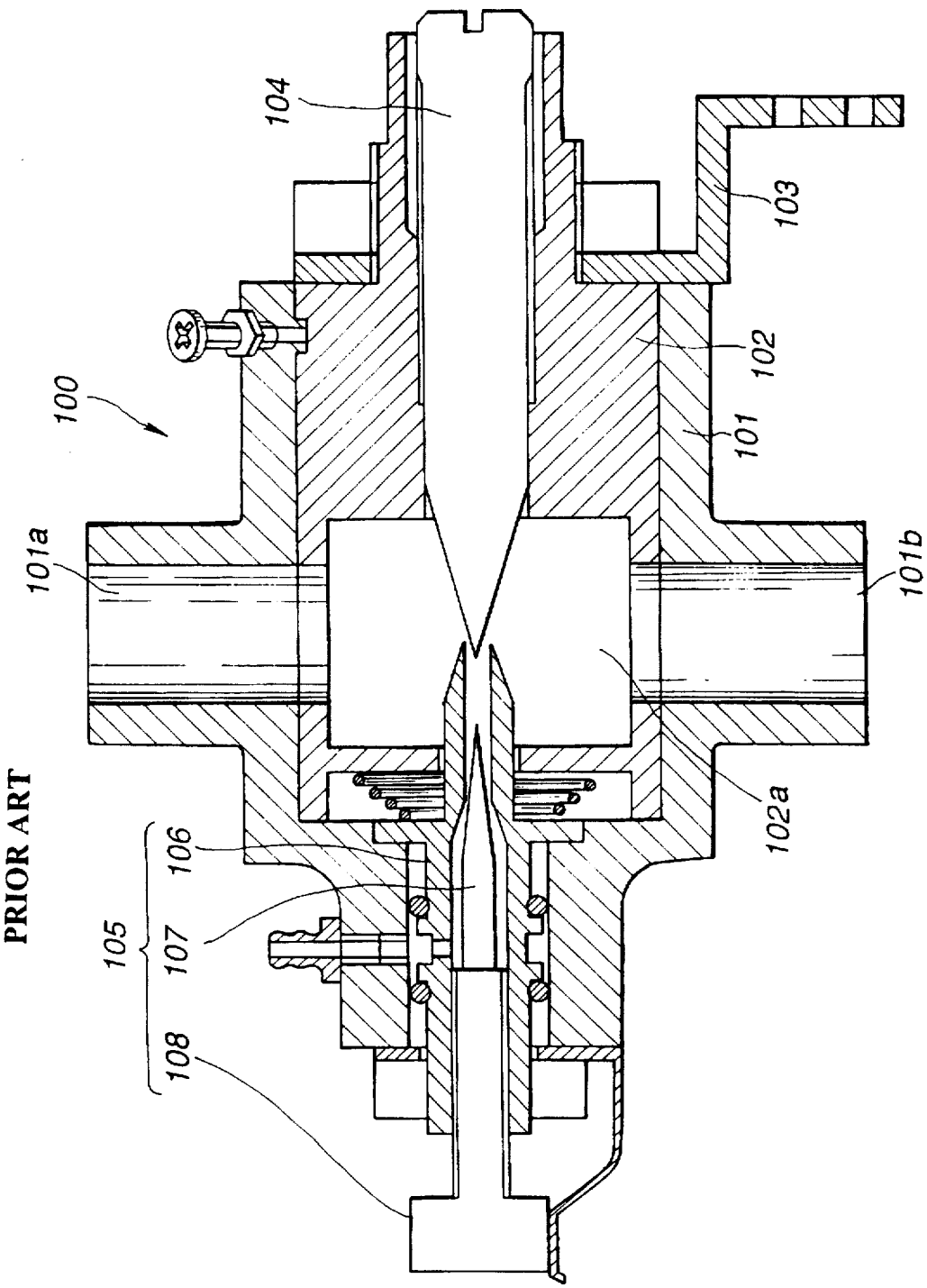
FIG. 8 is a cross-sectional view of a conventional carburetor.

The third embodiment of the present invention is described referring to FIG. 7. The same engine 1 and the same model on which the engine 1 is mounted as used in the first embodiment are used in this embodiment.

The same functionally equivalent components of the fuel injector 60 shown in FIG. 7 as those of fuel injector 30 in the first embodiment are given the same characters as used in FIG. 2, and detailed description is omitted. An air inlet is provided on the side peripheral surface of the box 31 for connecting and communicating to the air bomb 9 or the crank chamber 2 in order to introduce air pressure into the box 31. A fuel feeding pipe 18 guided from the fuel tank 20 is connected to a fuel feeding passage 35 formed in the magnetic core 34 of the solenoid coil 32. Pressurized air introduced from the air bomb 9 or the crank chamber 2 of the engine 1 is introduced into the fuel tank 20 like the first embodiment, and fuel is pressurized with a low pressure.

One end of a connecting tube 51 is connected to one end of the magnetic core 34 of the solenoid coil 32. The other end of the connecting tube 51 is inserted slidably to the passage 39 of the valve body 38. The front face of the head 52 of the valve body 38 is formed in a shape of conical surface 53 to serve for sealing, and this sealing surface 53 is similar to the concave conical surface 54 formed on the valve box 36. The passage 39 of the valve body 38 is branched and to opens to the sealing surface 53. The needle 42 is provided on the end of the valve body 38, and inserted into the fuel injection orifice 37 of the valve box 36.

Between the fixing member 43 of the solenoid coil 32 and the valve box 36, the plate spring 44 is provided as a forcing means for forcing the valve body 38 in the direction of the fuel injection orifice 37. The fixing part 43 of the plate spring 44 is fixed between the fixing member of the solenoid coil 32 and the valve box 36, and the moving part of the plate spring 44 is engaged with the head of the flange 40 of the valve body 38.

When power is supplied to the solenoid coil 32, the magnetic core 34 pulls the valve body 38 against the elastic force of the plate spring 44 to form a clearance between the sealing surface 53 and the conical surface 54 of the valve box 36. Pressurized fuel fed into the box 31 is injected together with pressurized air injected from the fuel injecting orifice 37 to the outside of the box 31 with the same pressure synchronously with fuel injection timing. When, because the flow of the pressurized air is fast, the air flow acts so as to suck out the fuel to the outside of the box 31. Therefore in this embodiment, the pressurized fuel fed into the fuel injector 60 is mixed with pressurized air introduced from the pressure supplying means to the box 31 to a some extent, and then injected from the fuel injecting orifice 37 in a form of mist, thereby the combustion efficiency of the engine 1 is improved.

As described herein above, this fuel injector 60 provides a function like that of a carburetor used for the conventional engines, the action of supercharging is obtained by controlling the supply of air relatively to the feeding of fuel, and the power of the engine 1 can be boosted up. The fuel injector 60 of the embodiment is incorporated in the engine 1 mounted on a model plane, therefore fuel can be fed insufficiently due to the effect of centrifugal force and gravity. However, air which has a low specific gravity and is not affected very much by centrifugal force and gravity is fed to the fuel injector 60 with the same pressure as that of fuel. The required quantity of fuel is fed into the fuel injector 60 because of cambium effect of air regardless of centrifugal force due to flying movement of the model plane and gravity.

While power is not supplied to the solenoid coil 32, pressurized air guided into the box 31 exerts a force on the flange 40 of the head of the valve body 38 to push the valve body 38 in the direction so as to close the fuel injection orifice 37. Also the plate spring 44 pushes the valve body 38 in the direction so as to close the fuel injection orifice 37. Thereby, the fuel injection orifice 37 is closed consistently while fuel is not injected and fuel will not leak.

In respective embodiments, the fuel injectors 30, 50, and 60 are used for an engine mounted on a radio control model plane only for description, however, the model in the present invention includes not only radio control model planes for hobby but also moving articles having an engine used for general industrial use, and includes model vehicles and model boats.

According to the engines for models in accordance with the present invention, even if the fuel injector is used for an engine mounted on a radio control model plane which is operated under severe operational conditions such as acrobatic rapid acceleration, rapid deceleration, and loop flying, because the adequate quantity of fuel is injected at the adequate timing stably, thus the air-fuel balance is maintained, the engine exhibits stable and high performance, and the speedy response is realized.

While a preferred embodiment of the present invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. An engine for radio controlled models comprising:
   a cylinder having a combustion chamber;
   a piston mounted for reciprocal motion within said cylinder;
   a crankshaft supported for rotation within said engine in response to the reciprocation of said piston;
   a fuel injector for supplying fuel to said combustion chamber;
   a throttle valve for controlling intake of air into said combustion chamber;

means for detecting a stroke signal representing a cycle of rotation of said engine; and a radio control receiver having a control unit for generating a fuel injection signal to electrically control the supply of fuel to said engine and a throttle adjusting signal to control an opening degree of said throttle valve, said control unit comprising:

means for determining a fuel injection starting timing signal from said stroke signal, means for determining a fuel injection duration signal from said throttle adjusting signal; and means for providing said fuel injection signal based on said fuel injection starting timing and said fuel injection duration signals to cause said fuel injector to inject fuel to said combustion chamber.

2. The engine for models as claimed in claim 1, wherein said stroke detection means is a rotation detection sensor for detecting the rotation of said crank shaft.

3. The engine for models as claimed in claim 1, wherein said engine for models has a cam shaft, and said stroke detection means is a rotation detection sensor for detecting the rotation of said cam shaft.

4. The engine for models as claimed in claim 1, wherein said engine has a temperature sensor for detecting the temperature in said combustion chamber, and said control means corrects at least any one of said fuel injection starting timing and said fuel injection time depending on the temperature of said combustion chamber detected by said temperature sensor.

5. The engine for models as claimed in claim 1, wherein said control means corrects said fuel injection time determined based on said throttle adjusting signal depending on the rate change of said throttle adjusting signal if the rate change of said throttle adjusting signal exceeds a reference value.

6. A radio control receiver for radio controlled models comprising:

a receiving section configured to receive a throttle signal transmission and to generate and supply a throttle adjusting signal to a throttle valve driver of a throttle valve for controlling the intake of air into an air-fuel engine of a radio controlled model;

a fuel injection circuit configured to receive a stroke signal indicating a cycle of rotation of a piston of the air-fuel engine, said fuel injection circuit electrically coupled to said receiving section so as to receive the throttle adjusting signal from said receiving section, said fuel injection circuit configured to generate a fuel injection starting timing signal based on said stroke signal, said fuel injection circuit configured to generate a fuel injection duration signal based on said throttle adjusting signal, said fuel injection circuit configured to generate a fuel injection control signal based on said fuel injection starting timing signal and said fuel injection duration signal and to supply a fuel injector of the engine with said fuel injection control signal.

* * * * *